April 20, 1954  W. L. PARKER  2,675,679
HYDRAULIC MOTOR AND EMERGENCY RELEASE CONTROL VALVE
Original Filed March 29, 1948  4 Sheets-Sheet 1

INVENTOR:
Warde L. Parker
By Herbert E. Metcalf
HIS PATENT ATTORNEY

SPOOL TRAVEL - Inches

INVENTOR:
Warde L. Parker
HIS PATENT ATTORNEY

Patented Apr. 20, 1954

2,675,679

UNITED STATES PATENT OFFICE 2,675,679

HYDRAULIC MOTOR AND EMERGENCY RELEASE CONTROL VALVE

Warde L. Parker, Los Angeles, Calif., assignor to Northrop Aircraft, Inc., Hawthorne, Calif., a corporation of California Original application March 29, 1948, Serial No. 17,624, now Patent No. 2,631,571, dated March 17, 1953. Divided and this application July 29, 1952, Serial No. 301,559

7 Claims. (Cl. 60—97)

This application is a division of my application Serial Number 17,624, filed March 29, 1948, now U. S. Patent No. 2,631,571.

The present invention relates to hydraulic motors and the control therefor, and, more particularly, to a hydraulic motor and control valve ideally adapted for full power action of airplane control surfaces under pilot actuation of the hydraulic motor valve.

In the U. S. application, Serial No. 23,567 filed April 27, 1948, now abandoned, Feeney describes and claims certain control surfaces for all-wing airplanes, such as those used on the U. S. Army bombers designated as the XB-35 and YB-49. These controls were shown to be full power operated under pilot control, and, as far as is presently known, the XB-35 and YB-49 airplanes are the first large airplanes to be successfully flown with full power operation of the control surfaces, although such power operation was extensively flight tested in a smaller all-wing prototype of the XB-35 prior to use in the latter airplane.

The full powered surface controls of the XB-35 bomber for example, are hydraulically operated under the application of minimum control column force by the pilot, without control surface feed-back or feel being transmitted to the pilot, and the present invention has for an object the provision of a means of insuring proper full power operation of airplane control surfaces, such as those used in the XB-35 and YB-49 for example.

The XB-35 and YB-49 airplanes are, even for today, very large airplanes having a maximum gross weight of around 200,000 lbs. with a wing spread of 172 ft., the only difference between the two designs being a substitution of jet engines in the YB-49 for the reciprocating engines of XB-35. The control surfaces of these airplanes, such as the elevons, for example, each have an area of approximately 382 sq. ft. With one elevon to each wing panel, these surfaces are moved together for pitch and climb control and separately for roll control. It has been calculated that the pilot might have to exert a stick force under extreme circumstances in flight of over 8000 lbs. in order to move these surfaces for proper flight control if the surfaces were to be controlled manually without power or air boost. Such forces are, of course, highly impractical if not impossible to attain.

Extensive investigation has shown that, for such large control surfaces, auxiliary power systems that boost, but do not entirely remove direct pilot force application, are neither practical nor desirable, and furthermore, are highly complicated. So, during preliminary design studies of the XB-35 airplane, which was flight tested before the YB-49, full power operation of the control surface therefore was thoroughly investigated. After study, hydraulic operation of the control surfaces was decided upon and a large number of the presently known hydraulic motors and control valves were studied and the more promising ones tested. All were failures for dependable airplane control surface operation for one reason or another. During this investigation, it was found that the basic requirements for the successful operation of a hydraulic motor when used for full power operation of airplane control surfaces depend to a large extent on the action of the control valve, which, ideally, should have the following characteristics:

1. There should be a restricted flow to the hydraulic cylinder to prevent chatter.

2. The restriction to the flow should be lessened, but not completely removed, when the valve is displayed to full travel.

3. There should be a constant neutral point leakage to avoid oil hammer due to rapid valve motion, and to achieve fine positioning of the control surface.

4. There should be neutral leakage into both ends of the hydraulic cylinder to preload both sides of the cylinder piston, thereby providing rigidity against loads imposed upon the control surface as a result of shock conditions during flight.

5. There should be a minimum of centering forces developed during operation of the valve, to provide low control column forces for operation.

6. The valve must be self-cleaning, or constructed to minimize valve malfunctioning due to clogging or jamming.

7. The valve must be capable of free operation in case of failure of hydraulic pressure, in order that control surface operation can be continued by other means.

8. The device must be simple to construct and easy to service.

It was found that none of the available valve structures could meet the above requirements, and it is accordingly an object of the present invention to provide a valve for the operation of a hydraulic motor cylinder meeting the above requirements.

It is another object of the present invention to provide a valve which is capable of releasing pressure fluid from one side or the other of a hydraulic cylinder piston in the event of malfunctioning thereof, so that the possibility of hydraulic lock is substantially reduced or removed.

Still another object of the present invention is to provide a valve for a system wherein a single control surface, which is driven by a plurality of hydraulic motors connected in parallel with each motor being controlled by a separate valve, will drive the surface and other valves should one valve be rendered inoperable as by jamming for example.

These and other objects will be seen as the specification continues.

That these requirements have been fully met by the device of the present invention is amply proved by the successful flights of the all-wing airplanes known as the XB–35, as described above, and its jet driven companion airplane, the YB–49, both of which utilize full power operation of certain of their control surfaces, their elevons and drag rudders in particular, utilizing embodiments of the hydraulic motor and valve of the present invention.

The emergency release valve of my present invention, in one preferred form as applies to an airplane control system wherein a single control surface is operated by at least two hydraulic motors and control valves connected in parallel thereto for example, operates by opening the pressure locked side of the piston in a hydraulic motor cylinder to which the valve is connected for the operation and control thereof, to obtain drainage from individually locked sides of the piston so that relative movement of the companion piston and cylinder is possible in an emergency, the hydraulic cylinder carrying the malfunctioning valve idling and being driven by the operable cylinder and valve assembly.

Briefly, the valve described above comprises a casing having a pressure fluid inlet port for connection to a source of fluid under pressure and a return fluid port for draining one side or the other of the piston in a hydraulic motor cylinder to which the valve is connected for the operation thereof. In the casing, connection ports are provided to both sides of the piston, these ports being controlled to open and close by means of a valve spool which is movable in the casing in either direction from a neutral position to gradually increase the flow to one side or the other of the cylinder piston; a neutral flow of a predetermined amount to both sides of the piston being permitted by proper arrangement of the spool with respect to the connection ports when the spool is in the neutral position. Pressure release means is integrally associated with the valve spool and cooperates with the operating rod of the spool to open the pressure locked side of the piston to obtain drainage therefrom in an emergency, to prevent a hydraulic lock so that operation of the control system is possible. A central pressure release means for the control valve is thus provided which will be immediately operable in emergencies such as such control valve jams, for example.

The invention will be more fully understood by reference to the following description relating to the accompanying drawings in which.

Figure 1:
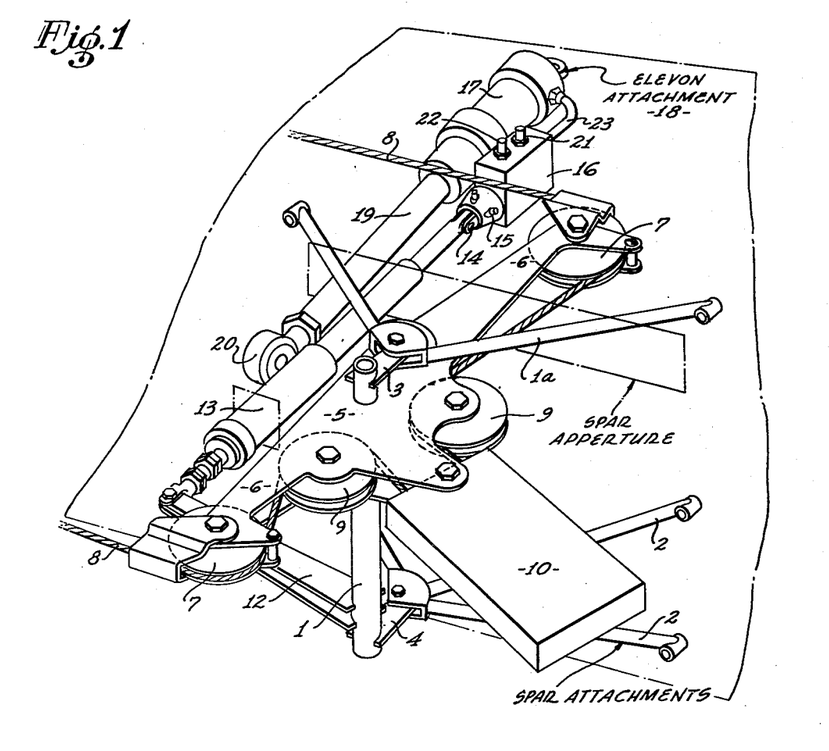
Figure 1 is a perspective view of one preferred form of the present invention as installed to control an elevon for pitch, climb and roll control on a large airplane such as the XB–35 described above.

Referring first to Figure 1, which shows in perspective view an actual installation of a hydraulic motor as used to operate an elevon, a vertical axle 1 is placed within a wing panel, for example, and pivoted to wing spar attachments 1a and 2 at each end thereof respectively, by short bellcrank arms 3 and 4 respectively. Above, axle 1 carries a pulley plate 5 extended to cross arms 6 carrying end pulleys 7 over which run control cables 8 to be operated by the pilot from the control column or stick as may be utilized. Cables 8 pass around tension box pulleys 9 to enter a cable tensioning box 10 attached to the pulley plate 5 as is well known in the art. Rotation of axle 1 by the pilot moves long bellcrank arm 12 which is attached to a spring loaded valve operating rod 13 passing through an aperture in the wing spar to link with a valve attachment 14. The spring load in rod 13 is such that the rod will extend or contract to protect the attached valve if manned by the pilot with no hydraulic pressure available to cause the surface to follow up the control column movement for example.

Valve attachment 14 enters a valve assembly 15 inserted in a valve block 16 securely fastened to one end of a hydraulic motor cylinder 17, the other end of cylinder 17 being attached to an elevon operating arm (not shown) by elevon attachment 18. A hydraulic piston rod 19 enters cylinder 17 opposite elevon attachment 18 and is attached to a wing point by wing attachment fitting 20. Piston rod 19 is, as is well known in the art, attached to a hydraulic piston (not shown) inside of cylinder 17.

Valve block 16 is provided with a hydraulic fluid pressure inlet 21 and a fluid return pipe 22. The piston rod end of the cylinder 17 is supplied with fluid through the valve block, and the closed end of the cylinder is supplied through the block and through outside pipe 23.

In operation, it will be noted that as the cylinder is attached to the elevon operating arm and the piston rod to the wing, and the valve and valve block is attached to the cylinder, with the valve operating rod 13 coming from the wing, that no mechanical feedback link is needed. With the valve operating rod 13 in neutral position the elevon is held in position. When the valve operating rod 13 is moved by the pilot, fluid is admitted to one or the other sides of the piston with the opposite side of the piston open to the fluid return. The cylinder then moves in accordance with the pressure application and the aileron moves. As it moves, however, the valve also moves as it is attached to the cylinder. When the neutral point within the valve is reached the elevon movement stops. Thus, the cylinder and, consequently, the elevon will follow all pilot initiated movements of the valve operating rod 13. The extremely short feedback circuit created by the attachment of the valve to the cylinder with the cylinder moving with the aileron effectively prevents hunting. This type of operating connection, however, is not part of the present invention, being described and claimed in the copending U. S. application cited above.

In the motor system described above, all of the requirements outlined above for successful operation of the motor itself are attained by the design and construction of valve assembly 15 to embody the present invention. One form of successful valve is shown in Figures 2 and 3 which will next be referred to.

Valve assembly 15, one end of which projects from valve block 16 in Figure 1, comprises a spool casing 24 adapted to be fastened into valve block 16 and an inner spool 26 to be moved by valve operating rod 13. The spool casing starts, at the left of the figures, with a hollow spool slide end 30 followed by a barrel portion 31 of uniform outer diameter to terminate in a threaded end 32. These three portions are separate and abut with ground faces so that slide end 30 can be attached to valve block 16, and the entire spool casing tightened up by screwing threaded end 32 into the valve block 16.

The inner terminus of slide end 30 is provided with opposed ports 35 entering a return chamber 36 which is separated from a slide chamber 37 in this end by a partition 38 bored out to pass a spool rod 39 attached outside of partition 38 to slide 40 in turn attached to valve rod 13. Slide 40 is held to a fixed travel by slide pin 41 attached to slide end 30 and passes through elongated hole 42 in the slide 40. A spool rod packing 43 of the O ring type is installed in partition 38. Spool rod 39 is attached by spool pin 44 to the spool 26 sliding inside of spool casing 24. Spool pin 44 is in line with ports 35 for easy assembly. Spool 26 will be described later.

Figure 2:
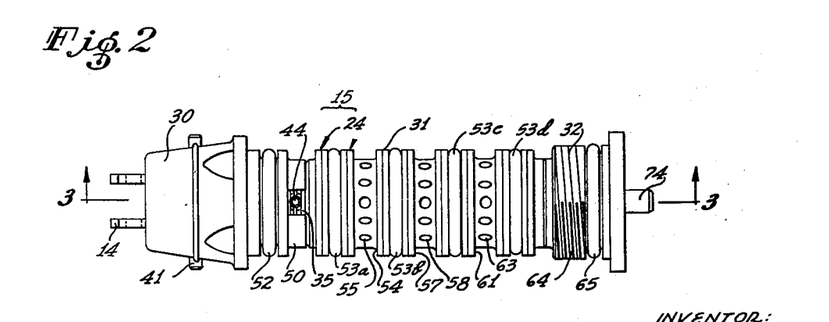
Figure 2 is a view in elevation of the valve assembly used in the system shown in Figure 1.
Figure 3:
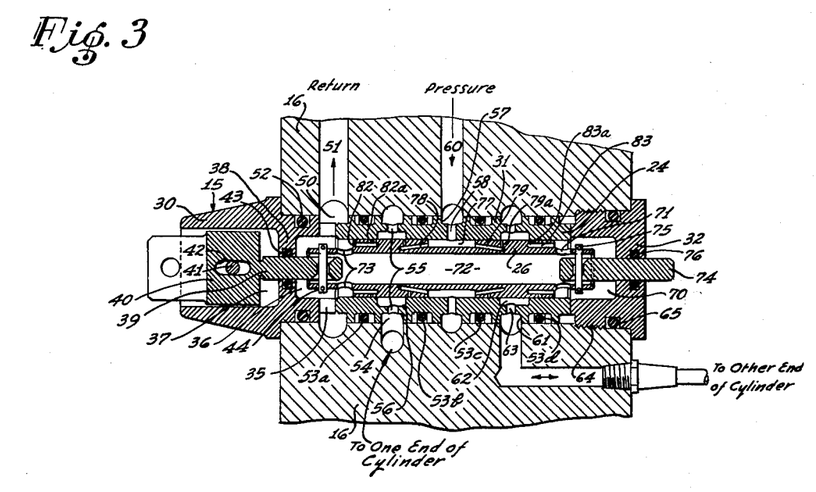
Figure 3 is a longitudinal sectional view taken as indicated by the line 3—3 in Figure 2, with a portion of the valve block added.

On spool casing 24, as shown in Figure 2, connecting opposed ports 35 is a peripheral return fluid groove 50, which when the valve assembly is in place in valve block 16, communicates with fluid return pipe 22 on the valve block through return bore 51. An outer slide-end packing seal 52 isolates return fluid groove 50 from the outside of the valve block.

To the right of the return fluid groove 50 is an outer ring seal 53a separating fluid return groove 50 from one cylinder chamber groove 54 having circumferential cylinder ports 55 therein communicating with inner cylinder chamber groove 56 (Figure 3) facing the spool 26. Another outer ring seal 53b follows, then an outer pressure fluid groove 57, communicating with the interior of the groove 57, communicating with the interior of the spool casing without an inner groove by pressure ports 58.

The outer pressure fluid groove 57 connects through valve block 16 with pressure inlet 21 through pressure bore 60.

Next is still another ring seal 53c followed by a second outer cylinder chamber groove 61 connecting with an inner second cylinder chamber groove 62 by circumferential cylinder ports 63. A fifth ring seal 53d follows. Next comes the threaded end 32 with threads 64 sealed from the outside by threaded end ring seal 65.

Threaded end 32 is provided with a threaded end return fluid chamber 70 connecting with slide end return chamber 36 by threaded end ports 71 through a central spool bore 72 and slide end ports 73. These ports 73 connect with return groove 36, bore 51 and then to return pipe 22.

Both ends of spool 26 are exactly alike, the spool being attached at the threaded end to a spool idler rod 74 by idler pin 75. Idler rod 74 passes through the threaded end 32 and is sealed by idler pin seal 76 mounted in the threaded end. As the exposed face sections at each end of spool 26 are the same, and the rods are the same diameter, no piston effect is applied by the return fluid pressure.

The detailed construction of the spool shown in Figure 3 will next be described. Opposite pressure ports 58 leading to outer pressure fluid groove 57 the spool is cut away to form a circumferential fluid distributing groove 77 extending equal distances, when the spool is in neutral position, on each side of pressure ports 58. This distributing groove 77 is provided with sides normal to the surface of the bore in which the spool slides, and a plurality of circumferentially distributed pressure bores 78 and 79 extend longitudinally in the spool wall from respective sides of the pressure distributing groove 77 a sufficient distance to terminate beyond the near sides of inner first and second cylinder chamber grooves 56 and 62 in the spool casing.

Both ends of the spool 26 are also cut away opposite return fluid chambers 36 and 70 to form shoulders which also have circumferentially spaced return bores 82 and 83 respectively, extending longitudinally in the spool 26 past the opposite sides of the inner first and second cylinder chamber grooves 56 and 62 respectively.

The spool construction is completed by four sets 82a, 78a, 79a and 83a of flow holes bored normal to the peripheral surface of the spool and entering the various bore holes 82, 78, 79 and 83 respectively. The flow holes are bored with definite patterns with respect to the various inlets and outlets of casing and spool. These flow holes pass all the liquid flow through the valve, as slide pin 41 limits the travel of the spool to less than the travel required to open pressure groove 77 on the spool to either of the inner cylinder chamber grooves 56 or 62. Thus the only flow is through the flow holes. As a strong shearing action can take place between the valve casing and the spool at the flow holes, which will minimize the possibility of the spool jamming due to particles entering the holes, it is preferable to harden the spool and casing surfaces, as for example to Rockwell "C" 53–58, and to make all parts of material having the same temperature co-efficient of expansion to avoid binding between operating temperatures of from —65° F. to 165° F. for example.

In the form shown in Figure 3, the flow holes are arranged in a pattern spirally spaced around the periphery of the spool. The spiral pattern of the flow holes 82a, 78a, 79a and 83a is made such that a desired cylinder control flow is obtained, with a predetermined neutral leakage, an ample but restricted flow at all times, this restricted flow increasing in volume as the spool is moved in either direction.

In Figure 3, the spool is shown in neutral position. The rows of flow holes 78a and 79a nearest to the pressure inlet 60 are arranged so that one hole only of each row is bisected by the more central shoulders of cylinder grooves 56 and 62, respectively. The rows of flow holes 82a and 83a are arranged so that one hole only of each row at the return flow grooves 56 and 62 is bisected by the outer shoulders of return flow grooves 56 and 62, respectively. Thus, a small fluid flow is constantly applying pressure to both ends of cylinder 17 through the centrally bisected flow holes. The fluid then leaks to the return by the same amount through the bisected flow holes in rows 82a and 83a. This arrangement is more clearly shown in Figure 4. In one preferred form, the pressure of 2000 p. s. i. is used in pressure inlet 60 and the bisected flow holes are proportioned to provide a pressure drop of 1000 p. s. i. In consequence, there is at all times, in the neutral spool position, a preload of 1000 p. s. i. on both sides of the cylinder piston, thus preventing motion of the attached control surface under shock conditions.

Figure 4:
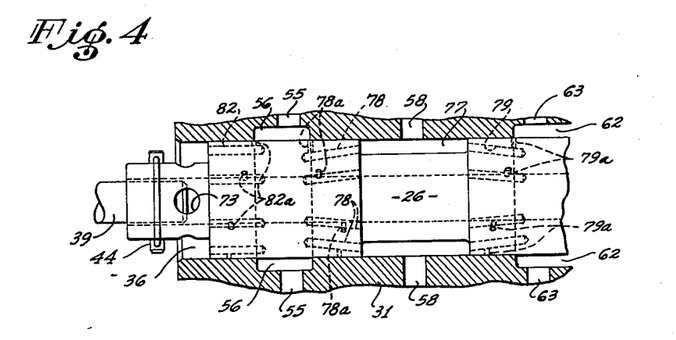
Figure 4 is a diagram showing the flow hole arrangement of the spool of Figure 3.

A minute movement of the spool of only about .007" in the case of the use of .013" flow holes will close the normally bisected flow holes on one side of the spool and open the other normally bisected holes. Then fluid to one side of the piston will be made at a highly restricted rate as determined by the pressure and hole diameter so that the piston moves very slowly. Further motion of the spool will uncover more holes in the patterns on one side of the spool neutral, the opposite holes remaining closed so that an increasing but still restricted flow will be obtained to move the piston faster.

Figure 5:
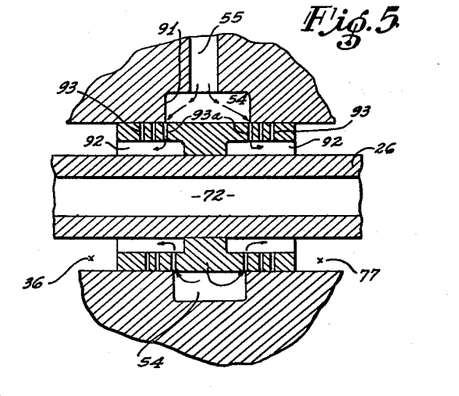
Figure 5 is a diagram showing another arrangement of obtaining neutral point leakage and restricted flow in accordance with the present invention.
Figure 6:
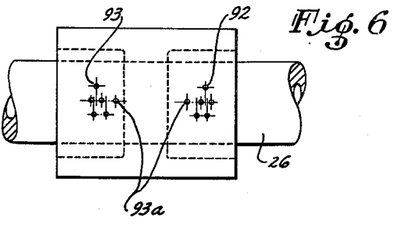
Figure 6 is a diagram showing the flow aperture pattern in the valve spool of Figure 5.
Figures 10, 11:
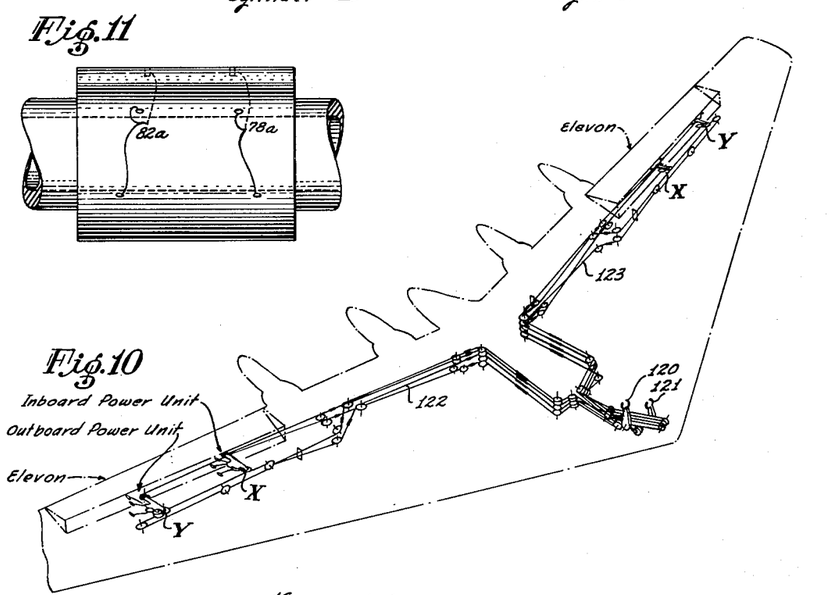
Figure 10 is a diagram of an elevon control system utilizing two hydraulic motors.
Figure 11 is a diagrammatic view in elevation of one spool plug portion of the spool used in the device of Figures 3 and 4 oriented to show the spiral flow hole pattern.

Here, one section of the spool 26 as shown in the diagrammatic Figure 6 is illustrated as having closely grouped flow holes rather than the spiral pattern shown in Figures 3, 4 and 11. In Figure 5 the spool plug controlling the flow of fluid through cylinder chamber groove 54 and circumferential cylinder ports 55, i. e., the same plug as shown in Figure 6, is undercut to provide opposite fluid channels 92, these undercuts taking the place of bore holes 78 and 82, shown in Figure 3 and 4, to connect the bore holes with the open pressure groove 77 on the spool 26.

Figure 7:
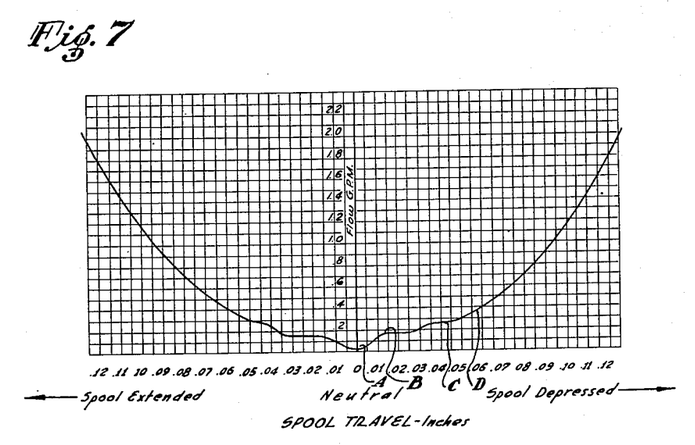
Figure 7 is a coordinate diagram showing flow in gallons per minute as plotted against spool travel away from neutral in the valve shown in Figure 3 or 5.

A plurality of fine flow holes 93 are then drilled radially, grouped in a predetermined longitudinal channel 92 connecting the spool periphery with the fluid outlets. The nearest of these holes 93a in each pattern are drilled so that they will be substantially bisected by shoulders 91 of the groove 54 when the spool plug is in neutral position. This is not a delicate machine operation as the shoulders can be machined to close tolerances and the holes accurately located and drilled. Additional holes are then drilled outwardly from the first holes to be progressively uncovered as the spool is moved, as for example, in a relatively close pattern such as shown in Figure 6. In one specific example, 6 holes are used in each pattern, each .013" in diameter. This is sufficient, under 2000 p. s. i. fluid pressure, to provide a full flow of up to 4 G. P. M. with all six holes uncovered for example which is sufficient for action of the cylinder piston for aileron control. The neutral leakage can be made less than .01 G. P. M. but still sufficient to provide preload for the cylinder piston. The hole pattern can, of course, be changed as desired to get any desired relation of restricted flow and spool travel. The result of actual flow measurement of one specific valve made in accordance with the hole pattern of Figures 5 and 6 with respect to spool travel, is shown in Figure 7, only the lower part of the curve being shown. This curve closely resembles curves found for the device of Figures 3 or 5.

Here the neutral leakage is clearly shown at A with a flow rate of about .02 G. P. M. as the holes are bisected. Then as the spool is moved so that one hole is completely open with the opposite hole completely closed in both pressure and return channels, the flow rises to about .15 G. P. M. with the spool moved in one direction and about .18 G. P. M. in the other direction, with a spool travel of only about .015". The effects of uncovering additional flow holes just beyond the first flow hole is shown at points B, C and D and thereafter the effect of individual flow holes is not discernable. It will be noted that the curves on each side of the neutral point are remarkably alike, so alike in fact, that the pilot cannot detect the difference of response to control column movement in opposite directions. At the same time it will be noted that the response is extremely sensitive so that the pilot can make very small movements of the control surface. Obviously, however, response speed can be regulated by the flow hole patterns to get any curve desired.

Figure 8:
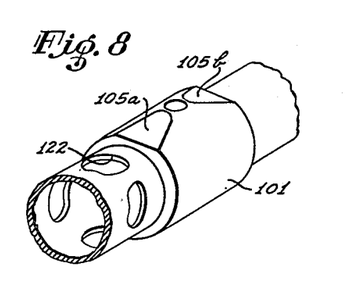
Figure 8 is a perspective diagram showing bevels made on a spool to provide neutral leakage and restricted flow.
Figure 9:
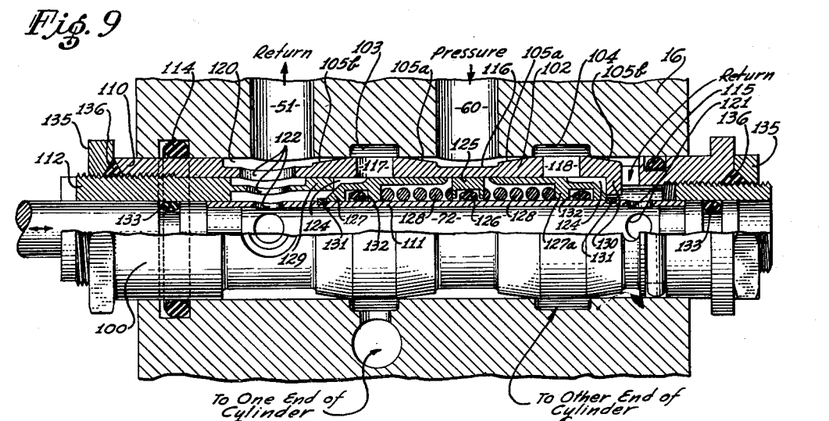
Figure 9 is a longitudinal sectional view of the valve of the present invention in one embodiment thereof utilizing the bevels of Figure 8 and provided with pressure release means.
Figure 12:
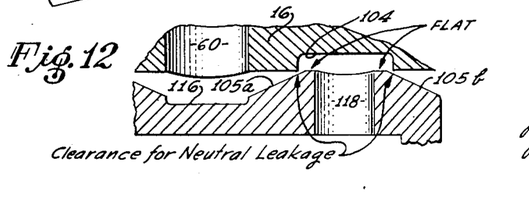
Figure 12 is a diagrammatic sectional view of a portion of the casing and spool of the valve shown in Figure 9; the clearances being exaggerated.

Still another type of suitable valve construction particularly useful for low flow rates is shown in Figures 8 and 9 which will next be referred to. In this case the valve spool 100 accomplishes the desired characteristics of providing a restricted flow increasing with spool travel, by having spool portions 101 and 102 facing valve block cylinder grooves 103 and 104 respectively provided with ground bevels 105 on each side thereof as shown in Figure 8. The central bevels 105a open into pressure inlet 60 in valve block 16 and the lateral bevels 105b (Figure 9) open into return port 51, one of them through the central bore 72 of the spool as in the embodiment previously described, the other directly. As shown in exaggerated form in Figure 12, the bevels 105 are positioned to provide a balanced preload flow to both sides of the piston as in the previous embodiment, with flow increasing as the spool is moved, due to the effective enlargement of the connection between the pressure inlet and cylinder ports on one side, with closure of the bevel on the opposite side of the cylinder grooves.

It is to be noted that in order for this action to take place in either the bevel or the hole type of valve, the major proportion of the areas of those portions of the spools 26 and 100 contacting the valve block adjacent cylinder grooves 54—62 and 103—104, respectively, is, at neutral, in fluid-tight overlap contact with the valve block surface with respect to said grooves. However, certain restricted and minor no-contact areas of the surfaces of spools 26 and 100, at the edges of the grooves always underlap the grooves at the neutral position. This is evidenced by the equal underlap of one half of holes 93a in spool 26 at neutral, as best shown in Figure 5; and by the equal underlap of the inner ends of bevels 105a and 105b of spool 101 when the spool 101 is in neutral, as best shown in Figure 9. It is only the no-contact underlap in both cases at the neutral position that creates the channels whereby the controlled neutral leakage and preload flow can take place. In both instances immediate overlap of the bevel or flow hole on one side of the grooves and cessation of flow takes place as the spool is moved to increase underlap and resultant flow on the other side of the grooves.

For flow rates up to and including about 4 G. P. M. the bevel type of valve has proved highly satisfactory. At flow rates substantially higher, a spool centering force may develop due to Venturi action of the fluid at the ports, the forces developed being in opposition to the pilot initiated movement of the spool. At such higher flow rates the embodiments of Figures 2 and 3 and 5 and 6 are preferred as in those embodiments the flow through the flow holes is at right angles to the movement of the spool and any forces developed due to the flow are not aligned with the direction of spool travel to cause any spool centering forces.

For maximum flight safety, the hydraulic control motor such as shown in Figure 1 is usually installed in duplicate so that in case of failure of one valve or motor, the other valve and motor can be still operated even though the two motors are connected together through the control surface as shown diagrammatically in Figure 10.

Here the pilot's control column 120 and copilot's control column 121 are interconnected and to control cables 122 and 123 leading to hydraulic motor X and to hydraulic motor Y, the cables being connected to operate both control valves thereof simultaneously. If one of these valves should jam it is highly desirable for the other valve to remain operable, and further, the jammed valve should be so constructed and arranged that it cannot produce a hydraulic lock in the motor cylinder. To take care of this contingency a pressure release means is provided in the present invention whereby even though the spool of one valve is jammed, the valve of the other motor can still be operated, and any hydraulic lock is thereby prevented in the damaged motor. One preferred form of suitable release valve is shown in Figure 9 as used in conjunction with the bevel type valve, which, due to the bevel angles is somewhat more susceptible to jamming than is the valve of Figure 3, which has shearing edges adapted to shear particles entering the flow holes. However, it would still be desirable from a maximum safety standpoint to provide the valve of Figure 3 with a pressure release means. For purposes of illustration the pressure release means is described herein as applying to the valve of Figure 9. Its use, however, in the valve of the type shown in Figure 3 will be apparent to those skilled in the art.

In Figure 9 the emergency release valve spool is composite; comprising an outer spool portion 110, an inner spool portion 111 and an intermediate spool portion 112. Outer spool portion 110 slides within the spool casing 16, being sealed at each end thereof by opposite O rings 114 and 115.

Opposite pressure inlet 60, the outer spool portion 110 is grooved, the groove 116 having a longitudinal extent of substantially the diameter of the pressure inlet 60. Peripheral cylinder connection grooves 103 and 104 are machined on each side of groove 116 in valve block 16. The outer spool portion 110 is provided with pressure relief ports 117 and 118 respectively, these ports being positioned opposite cylinder connection grooves 103 and 104. The bevels 105 are properly proportioned and arranged on the spool periphery to allow a small neutral flow from the pressure inlet 60 to each cylinder groove 103 and 104, and from each cylinder groove to the return outlet 51. In one instance this return flow is directed to a peripheral return groove 120 on the outer spool portion and in the other instance it is through return port 121, passing through the central bore 72 and through additional and preferably coaxially aligned return ports 122 in the three spool portions.

Inwardly of pressure groove 116 and pressure relief ports 117 and 118 the intermediate spool portion 112 is cut out to form a valve chamber 124 which is divided longitudinally by annular floating ring 125 having a close fit with the inner wall of the outer spool portion 110, but a loose fit with the outer periphery of the inner spool portion 111. This ring 125 is sealed with the inner spool portion 111 by an inner O ring 126.

In the valve chamber 124 and on each side of floating ring 125 poppet valves 127 and 127a are positioned each one being urged outwardly from the floating ring 125 by a preloaded valve spring 128.

One poppet valve 127 bears against an end shoulder 129 on the outer spool portion 110 and the other poppet valve 127a bears against a shoulder 130 on the intermediate spool portion 112. Both valves 127 and 127a define normally fluid pressure seals with their respective bearing shoulders 129 and 130.

Just beyond the seals, the poppet valves 127 and 127a are restrained from further outward movement by snap rings 131 mounted on the inner spool portion 111.

As there is a space between shoulders 129 and 130 and the opposite snap-rings 131, and as the poppet valves are cut away to provide a fluid path from the cylinder ports 117 and 118, any opening of a poppet valve will provide a free flow of fluid from the respective connected side of the cylinder piston into the return line via the normal return flow. The poppet valves 127 and 127a are sealed as they move on inner spool portion by internally retained ring seals 132.

The intermediate spool portion 112 is assembled on the inner spool portion 111 after the poppet valves and springs are installed. The inner spool portion 111 is thus free to move against the force of a poppet spring 128, being sealed against end leakage by end seals 133. The combined inner and intermediate spools are then inserted into outer spool portion 110 and securely locked in place by end nuts 135 which bear against locking and seal rings 136. A tight fit is provided at shoulder 129 to prevent leakage between spool portions 112 and 110. The inner spool 111 is then extended out of one end of valve block 16 to connect with a valve operating rod as for example the rod 13 shown in Figure 1.

The entire composite spool is inserted in the valve block and is freely movable therein in response to movement of the valve operating rod for normal fluid control. If, however, the connected outer and intermediate spool portions should jam at any point in travel, the inner spool portion can still move by compressing one or the other of the valve springs 128 through snap rings 131 and the respective poppet valve involved. This opening of the poppet valve will open the pressure locked side of the cylinder to the return 51, and because the other side of the cylinder is already open to the return, fluid is free to circulate in and out of the return port to permit the cylinder carrying the malfunctioning valve to idle, if and when the cylinder is moved by the other hydraulic motor through the attached control surface. The total permitted travel range of the inner spool is made sufficient to permit full stroke operation of the other motor valve spool so that with one valve jammed, control surface operation can still be obtained. This is a vitally important safety feature and insures uninterrupted operation of the control surfaces at all times when proper hydraulic pressure flow is available.

Because it is usually customary in military airplanes to provide an emergency surface operating system (usually being electrical in case of failure of the hydraulic system) and as the pilot's controls are moved to operate the electrical system; the valve spools are likewise operated preventing hydraulic lock. If both of the valve spools are jammed, thereby making use of the emergency system obligatory, the poppet valves will open in the proper direction to prevent hydraulic lock.

The tension of each poppet valve spring is adjusted so that, as far as these springs are concerned, spring loaded valve operating rod 13 (Figure 1) will at all times act as a solid rod. In practice, with one form of valve as described, the poppet valve springs are preset to remain closed under a pressure of not less than 25 lbs., and to be opened by a load not exceeding 45 lbs. for example, where the spring load of spring loaded rod 13 is approximately 85 lbs.

It will be seen from the above description that valves of the present invention, in addition to fulfilling the requirements for a control valve such as have been set forth in the present disclosure, provides an effective release means which is immediately operable in the event of an emergency, such as the jamming of the control valve; being relatively simple in design and economical of construction.

Reference has been made herein to the pilot of the airplane as being human. Obviously, however, when automatic piloting devices are used to take over control column movements, no difference in results obtained by the present invention will be found.

Furthermore, while the invention has been described as being ideally adapted for use in a control system for airplane surfaces, it will be obvious that the advantages of the invention as described herein can be put to many other uses. Such uses within the knowledge of those skilled in the art are deemed to be included in the scope of the appended claims.

What is claimed is:

1. A hydraulic motor control valve; comprising a casing having a fluid pressure inlet adaptable for connection to a source of fluid under pressure, and a return fluid port and connection ports to each side of a piston in a hydraulic cylinder, a substantially cylindrical spool movable within said casing in either direction from a neutral position to provide a predetermined neutral leakage flow between said pressure inlet and each of said cylinder connection ports and between each of said cylinder connection ports, and said return port to provide a preload on each side of said piston, said shape providing an increasing flow to one side of said piston as said spool is moved away from neutral position, and means defining normally closed fluid paths leading from alternate sides of said piston and coaxially enclosed within said spool, said means being slidably movable therein to open one side or the other of the piston in said hydraulic cylinder to said return fluid port during an abnormal condition of said spool.

2. Apparatus in accordance with claim 1 wherein said means is a valve provided within said spool between each of said cylinder connection ports and said return port, a spring normally holding each of said valves closed, and an operating rod connected to move said spool solely by pressure exerted against each of said valves in a direction tending to open said valve.

3. Apparatus in accordance with claim 1 wherein said means is a valve provided within said spool between each of said cylinder connection ports and said return port, a spring normally holding each of said valves closed, and an operating rod connected to move said spool solely by pressure exerted against each of said valves in a direction tending to open said valve, the force of said springs being greater than the force required by said rod to normally move said spool, said operating rod opening one of said valves when said spool fails to move as said operating rod moves.

4. In combination with a hydraulic valve having a spool movable in either direction from a neutral position to control fluid flow from a source of fluid under pressure to one side or the other of the piston in a hydraulic motor cylinder; a pressure release valve comprising an operating rod coaxially centered in said spool, by-pass valves normally elastically urged to block a connection between each side of said piston and a return fluid port at all spool positions, said by-pass valves being elastically urged in opposite directions, and moving with said spool, said operating rod being connected to said spool solely by contact with said by-pass valves in a direction tending to open one or the other of said by-pass valves in accordance with the direction of operating rod movement, the elastic urge force of said by-pass valves being greater than the normal resistance of said spool during movement thereof and less than a substantially greater abnormal resistance, whereby movement of said operating rod will overcome said urge force to open one or the other of said by-pass valves in case abnormal resistance to spool movement occurs.

5. In combination with a hydraulic control valve including a casing having a fluid pressure inlet adaptable for connection to a source of fluid under pressure, a return fluid port, cylinder connection ports to each side of a piston in a hydraulic motor cylinder, and a spool movable in either direction from a neutral position in said casing to control the flow of the fluid from a source of fluid under pressure to one side or the other of the piston in a hydraulic motor cylinder; a composite pressure release valve comprising an outer spool portion shaped to provide a gradually increasing flow to one side or the other of said piston as said spool is moved away from the neutral position thereof, an intermediate spool portion inside of said outer spool portion, said intermediate spool portion having means therein defining a by-pass channel between each side of said piston and said pressure inlet, and between each side of said piston and said return port, means normally closing each of said by-pass channels, an inner spool portion inside of said intermediate spool portion, an operating rod connected to said inner spool portion and associated with said means to move said outer spool portion to control the flow of fluid to one side or the other of said piston, whereby if said outer spool is rendered immovable in said casing, said operating rod will operate one of said means to open one of said by-pass channels to by-pass said fluid flow to said return port.

6. In combination with a hydraulic control valve including a casing having a fluid pressure inlet adaptable for connection to a source of fluid under pressure, a return fluid pipe having connections to each side of a piston in a hydraulic motor cylinder, and a spool movable in either direction from a neutral position in said casing to control the flow of fluid from a source of fluid under pressure to one side or the other of the piston in a hydraulic motor cylinder; a composite pressure release valve comprising an outer spool portion shaped to provide a gradually increasing flow to one side or the other of said piston as said spool is moved away from the neutral position thereof, means defining pressure release ports on said outer spool portion and connecting the interior of said outer spool portion with the pressure inlet of each side of said piston, means defining an internal annular valve seat inside of said outer spool portion adjacent one of said pressure release ports, and connecting the interior of said outer spool portion with said return pipe, an intermediate spool portion fixed inside of said outer spool portion, one end of said intermediate spool portion defining an annular valve seat adjacent the outer pressure release port and connecting the interior of said spool portion with said return pipe, spring loaded valves inside of outer spool portion and normally urged into each of said valve seats to block fluid flow therethrough, a hollow inner spool portion inside of said intermediate spool portion, said valve means, and said outer spool portion, means defining ports at each end thereof communicating with said return pipe, an operating rod connected to said inner spool portion and associated with said valve means to move said outer spool portion away from the neutral position thereof solely by pressure against said normally closed valves in a direction tending to open said normally closed valve, the force of said spring loads urging said valves into said seats being greater than the force required to normally move said outer spool away from the neutral position thereof, whereby if said outer spool portion is rendered immovable in accordance with movement of said operating rod said operating rod will force one of said valve means away from its respective valve seat against said spring load to connect the respective cylinder connection with said return pipe.

7. Apparatus in accordance with claim 4 wherein a plurality of said hydraulic motor cylinders are connected for operation in parallel, said control valves being simutaneously movable by separate control rods to each of said spools and by-pass valves, and wherein operation of the normally operating control valves is continued upon jamming of one control valve; the control rod of the jammed valve operating said by-pass valves to open alternate sides of the piston controlled by said jammed control valve in accordance with operation of the normally operated control valves to prevent hydraulic lock therein.

References Cited in the file of this patent

UNITED STATES PATENTS

| Number | Name | Date |
|---|---|---|
| 2,022,698 | Vickers | Dec. 3, 1935 |
| 2,127,877 | Maglott | Aug. 23, 1938 |
| 2,597,418 | Westbury et al. | May 20, 1952 |
| 2,597,419 | Westbury et al. | May 20, 1952 |
| 2,597,420 | Westbury | May 20, 1952 |